Aug. 14, 1945.    J. W. JOHNSON    2,382,422
SUCKER ROD CONNECTION
Filed Feb. 3, 1943    2 Sheets-Sheet 2
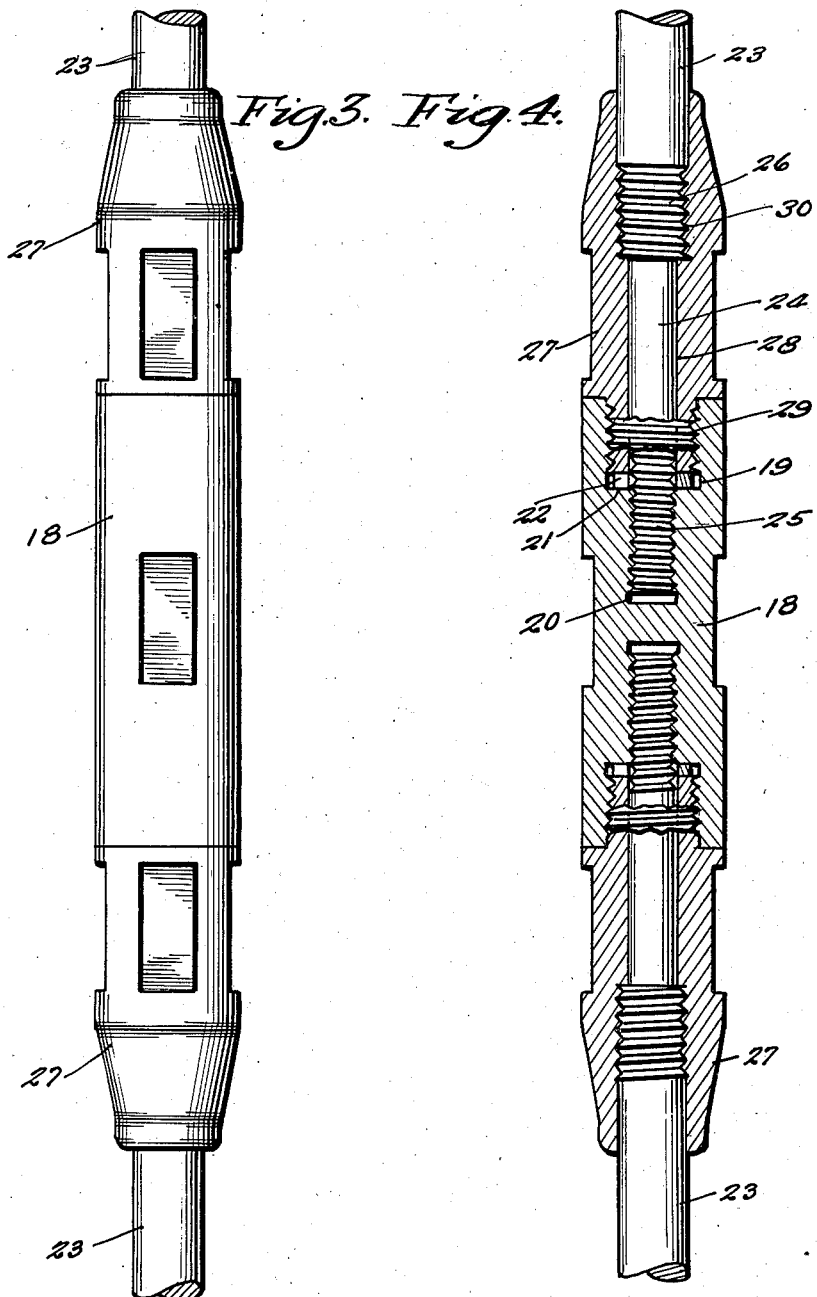
Inventor
Julius W. Johnson
By Clarence A. O'Brien
and Harvey B. Jacobson
Attorneys Patented Aug. 14, 1945

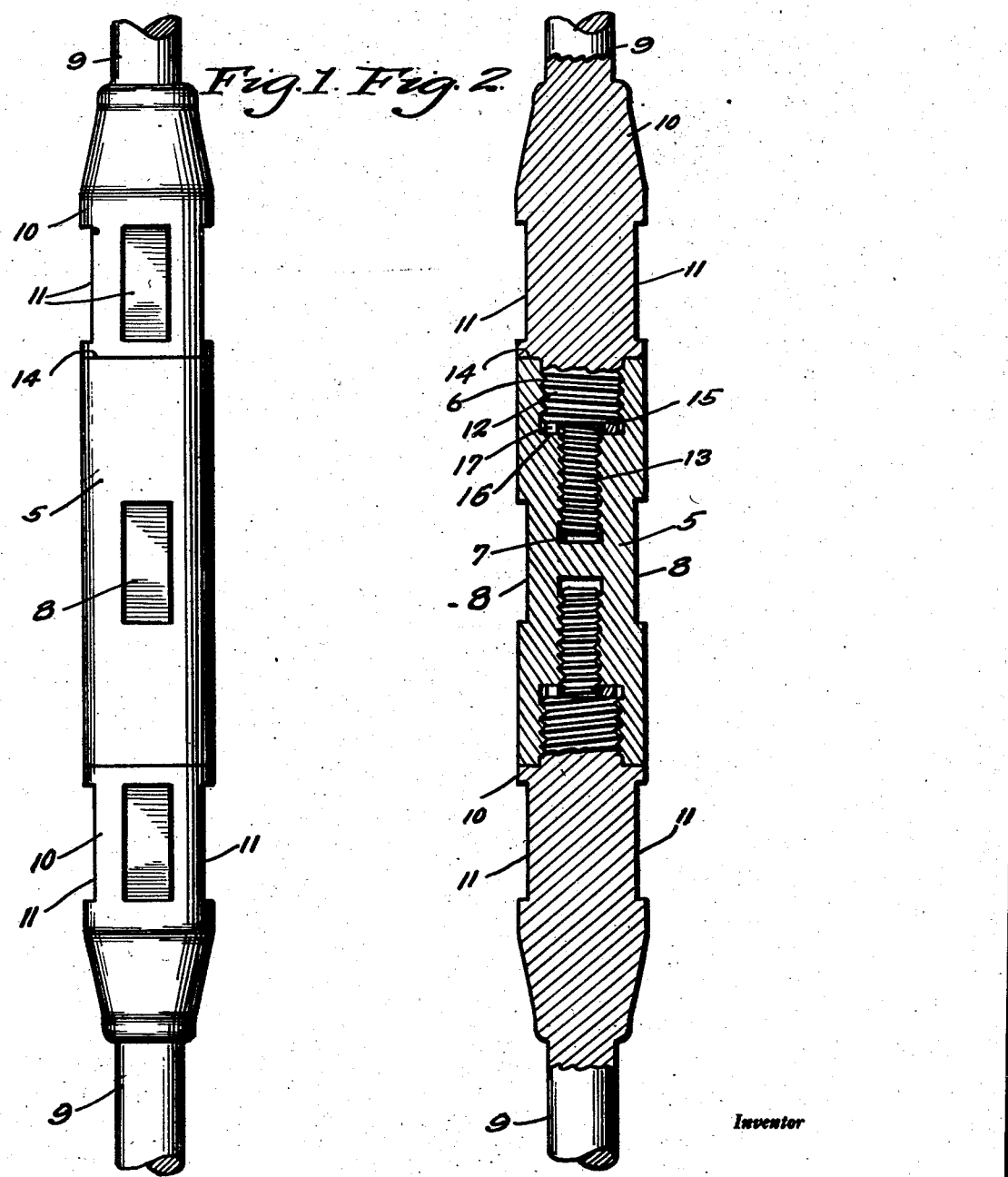

2,382,422

UNITED STATES PATENT OFFICE 2,382,422

SUCKER ROD CONNECTION

Julius W. Johnson, Austin, Tex.

Application February 3, 1943, Serial No. 474,587

5 Claims. (Cl. 287—125)

The present invention appertains to new and useful improvements in rod connections and more particularly to joints or connections for sucker rods such as are used for instance in oil and water wells.

The principal object of the present invention is to provide a rod connection of the character stated which is constructed in such a manner as to make it very unlikely that the same will become disconnected while in use.

Another important object of the invention is to provide a rod connection of the character described which is incapable of readily becoming accidentally disconnected and which is otherwise constructed to minimize wear on the connection box and interior of a well or other structure in which the same is used.

Still another important object of the invention is to provide a sucker rod connection which includes a rod end which may be discarded whenever it is worn beyond a state of further use, this without requiring the disposal of the rod proper.

Various other important objects and advantages of the invention will become apparent to the reader of the following description.

In the drawings—

Figure 1 represents a side elevational view of the connection.

Figure 2 is a longitudinal sectional view through the connection.

Figure 3 is a side elevational view of a modified form of the invention.

Figure 4 is a longitudinal sectional view through the modified form.

Referring to the drawings wherein like numerals designate like parts, it can be seen that the form of the invention shown in Figures 1 and 2 embraces a section 5 which is known in the oil industry as a connection box. This box is formed at each end with a threaded bore 6 and inwardly of these bores 6, the box is formed with smaller threaded bores 7. The outside of the box 7 is formed with flat portions 8 to permit engagement of a wrench or other tool.

Numerals 9, 9 denote rod sections, and each of these has head structures 10 at the ends thereof. Each head or end structure 10 has flattened portions 11 to accommodate a wrench or other tool.

In carrying out the present invention, each rod end 10 has a reduced threaded formation 12 for screwed disposition into the threaded bore 6, and further, each threaded portion 12 has a smaller or reduced threaded extension 13 for screwed disposition into the smaller threaded bore 7.

The threaded portions 12 and 13, being stepped, define shoulders 14, 15 which can jamb against the adjacent end of the box 5 and against the shoulder 16 between the threaded bores 6 and 7. It has been found highly practical to place a lock washer 17 between the shoulders 16 and the inner end of the threaded portion 12, as is clearly shown in Figure 2.

Thus it will be seen, that instead of the customary one point jamb, the rod end is connected to the box by two jambs with a lock washer 17 interposed in one jamb. Therefore, it can be seen, that a connection is provided which cannot become easily disconnected, excepting through the use of leverage tools.

A modification of the invention is shown in Figures 3 and 4, and in this modification it can be seen that numeral 18 denotes a connection box which is bored at each end and threaded as at 19. Each end of the box is formed with a smaller counterbore 20 which is threaded and these bores define an interposed shoulder 21 against which a lock washer 22 can be disposed.

Numeral 23 denotes a sucker rod and here let it be considered that this rod 23 is an old rod, from which the worn integral end has been cut. This form of the invention is intended to save old rods which would ordinarily be discarded.

In preparing the rod 23, the end portions of the same are machined down to provide reduced extensions 24. The end portions of the reduced portions 24 are threaded as at 25. The portions of the rod 23 immediately inwardly of the reduced portions 24 are formed with threads 26.

Numeral 27 denotes a replaceable rod end which has a smooth bore 28 extending inwardly from the inner end thereof, passing through a reduced threaded formation 29, this bore 28 merging with a threaded bore 30 for accommodating the threaded portion 26 of the rod 23. It is preferable that the rod 23 screw into the threaded bore 30 sufficiently far to conceal the threads of the rod 23 and, of course, the threaded portion 25 of the reduced portion 24 of the rod will have to project a substantial distance beyond the threaded portion 29 of the detachable rod end 27.

Obviously, the form of the invention shown in Figures 3 and 4 will provide means for reclaiming the greater number of sucker rods which are now discarded when the connection ends become worn beyond further use. The improved connection will serve to prevent the shut down of wells, especially wells which will return to water when not under operation.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

1. A rod connection comprising a box having stepped threaded bores in the ends thereof, rod ends, each of the rod ends being formed with stepped threaded portions for disposition into the stepped threaded bores of the box, said stepped portions defining shoulders and spring lock washers between certain of the shoulders adapted to be compressed to permit snug binding of certain other of the shoulders with portions of the box.

2. A connection of the character described comprising a box having threaded bores in the ends thereof, detachable rod end structures attachable to the ends of the box, and rod sections having their end portions disposed through the end structures and threadedly disposed into the box.

3. A connection of the character described comprising a box having threaded bores in the ends thereof, detachable rod end structures attachable to the ends of the box, and rod sections having their end portions disposed through the end structures and threadedly disposed into the box and into the end structures.

4. A sucker rod comprising a rod end and a socket member, said rod end being provided with a reduced threaded extension defining a shoulder at the rod end, said rod end being provided with threads and a shoulder inwardly of the last mentioned threads, said socket member having a threaded bore and a threaded counterbore extending outwardly from the outer end of the first bore to the end of the socket member, a shoulder in the socket member defined by said bores, and a spring lock washer adapted for interposition between the threaded extension shoulder and the shoulder of the socket member, the inward shoulder of the rod being adapted to contact and bind against the adjacent end of the socket member when the spring lock washer is substantially compressed between the adjacent shoulders of the socket member and rod extension.

5. A sucker rod comprising a rod end and a socket member, said rod end being provided with a reduced threaded extension defining a shoulder at the rod end, said rod end being provided with threads and a shoulder inwardly of the last mentioned threads, said socket member having a threaded bore and a threaded counterbore extending outwardly from the outer end of the first bore to the end of the socket member, a shoulder in the socket member defined by said bores, and a spring lock washer adapted for interposition between the threaded extension shoulder and the shoulder of the socket member, the inward shoulder of the rod being adapted to contact and bind against the adjacent end of the socket member when the spring lock washer is substantially compressed between the adjacent shoulders of the socket member and rod extension, the length of the threaded extension being substantially shorter than the depth of the first mentioned bore.

JULIUS W. JOHNSON.